(12) United States Patent
Goka et al.

(10) Patent No.: US 7,043,978 B2
(45) Date of Patent: May 16, 2006

(54) AIRFLOW METER

(75) Inventors: Yasushi Goka, Kariya (JP); Hideki Matsuura, Kariya (JP); Noboru Kitahara, Hekinan (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 11/115,352

(22) Filed: Apr. 27, 2005

(65) Prior Publication Data

US 2005/0241386 A1    Nov. 3, 2005

(30) Foreign Application Priority Data

Apr. 28, 2004    (JP)    ............................. 2004-134210

(51) Int. Cl.
*G01F 1/68* (2006.01)

(52) U.S. Cl. ..................................... 73/202.5
(58) Field of Classification Search ............ 73/204.21, 73/202.22; 7/202.5

See application file for complete search history.

(56) References Cited

U.S. PATENT DOCUMENTS

| 4,449,401 | A | * | 5/1984 | Kaiser et al. | ............... 73/202.5 |
| 4,571,996 | A | * | 2/1986 | Wakeman et al. | ......... 73/202.5 |
| 6,619,140 | B1 | * | 9/2003 | Kitahara et al. | ......... 73/861.52 |
| 6,786,089 | B1 | * | 9/2004 | Goto et al. | ............... 73/204.21 |

* cited by examiner

*Primary Examiner*—Jewel V. Thompson
(74) *Attorney, Agent, or Firm*—Nixon & Vanderhye PC

(57) ABSTRACT

An airflow meter has a bypass passage disposed in an air passage and a sensing portion disposed in the bypass passage to detect an airflow amount. The bypass passage is provided with a restriction portion to gradually decrease a passage width of the bypass passage in an airflow direction in the bypass passage. The restriction portion includes a first restriction portion and the second restriction portion disposed at an immediately downstream side of a narrowest portion of the first restriction portion. The first restriction portion gradually decreases the passage width in the airflow direction. The second restriction portion increases the passage width than the passage width at the narrowest portion in a stepped manner. The sensing portion is located in a bound in which the restriction portion is disposed.

9 Claims, 7 Drawing Sheets

AIRFLOW

AIRFLOW

AIRFLOW

AIRFLOW

AIRFLOW METER

CROSS REFERENCE TO RELATED APPLICATION

This application is based on Japanese Patent Application No. 2004-134210 filed on Apr. 28, 2004, the content of which is incorporated herein by reference.

FIELD OF THE INVENTION

The present invention relates to an airflow meter that has a bypass passage in an air passage and a sensing portion located in the bypass passage to detect an airflow amount.

BACKGROUND OF THE INVENTION

As a conventional art, JP-2002-357465-A, for example, discloses an airflow meter.

The airflow meter is for measuring an intake air amount of an internal combustion engine for example. As shown in FIG. 8, the airflow meter has a bypass passage 100 to introduce a part of the intake air and a sensing portion 110 disposed in the bypass passage 100 to measure an airflow amount.

The bypass passage 100 has a restriction portion 120 having a three-dimensional structure to gradually decrease a cross-sectional area of the passage in an airflow direction. By providing the restriction portion 120, a turbulence of the air introduced in the bypass passage 100 is limited, so that it becomes possible to obtain a stable output.

However, by providing restriction portion 120 in the bypass passage 100, the pressure loss large influences much in a small airflow condition when the intake air amount is small. Further, the cross-sectional area increases from a narrowest portion having the smallest cross-sectional area in the restriction portion 120 at a downstream side, generating a separation in the airflow (an eddy) which flows from a center portion toward an inner wall in the passage. Thus, in the small airflow condition, an airflow speed is decreased and fluctuated to cause an issue of spoiling a measuring accuracy.

Against this issue, as shown in FIG. 9, it is possible to decrease an influence of the pressure loss by shaping of the restriction portion 120 in such a manner of cutting off a downstream side thereof, namely terminating the restriction portion 120 at the narrowest portion.

However, by shaping the restriction portion 120 as shown in FIG. 9, the cross-sectional area intensively increases at the terminal end of the restriction portion 120, to generate the separation in the airflow (an eddy) and the turbulence of the air more than a structure shown in FIG. 8. Thus, it may rather spoil the measuring accuracy by the sensing portion 110 disposed in the restriction portion 120. Further, in a case that the air introduced in the bypass passage 100 flows upward as shown the figure, a downstream end face of the restriction portion 120 (a flat portion 130) is disposed upward, causing an issue that dusts sediment on the flat portion 130.

SUMMARY OF THE INVENTION

The present invention is achieved in view of the above-described issues and has an object to provide an airflow meter capable of decreasing a pressure loss by disposing a restriction portion in the bypass passage and restricting a separation in an airflow and/or a turbulence of an air in a vicinity of a sensing portion.

The present invention is an airflow meter having a bypass passage disposed in an air passage and a sensing portion disposed in the bypass passage to detect an airflow amount. The bypass passage is provided with a restriction portion to gradually decrease a passage width of the bypass passage in an airflow direction in the bypass passage. The restriction portion includes a first restriction portion and the second restriction portion disposed at an immediately downstream side of a narrowest portion of the first restriction portion. The first restriction portion gradually decreases the passage width in the airflow direction. The second restriction portion increases the passage width than the passage width at the narrowest portion in a stepped manner. That is, the second restriction portion limits the passage width to a constant width over a predetermined length in the bypass flow direction. The sensing portion is located in a bound in which the restriction portion is disposed.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF PREFERRED EMBODIMENTS (First Embodiment)

Figure 1:
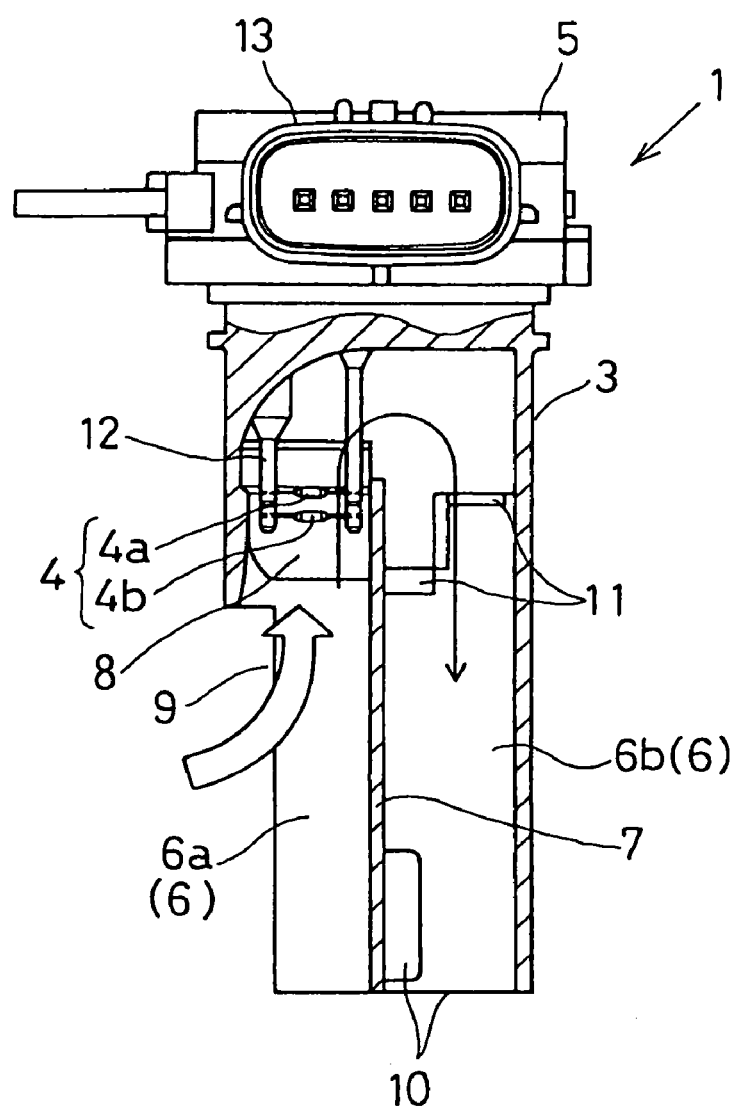
FIG. 1 is a cross-sectional view of an airflow meter according to an embodiment of the present invention.
Figure 3:
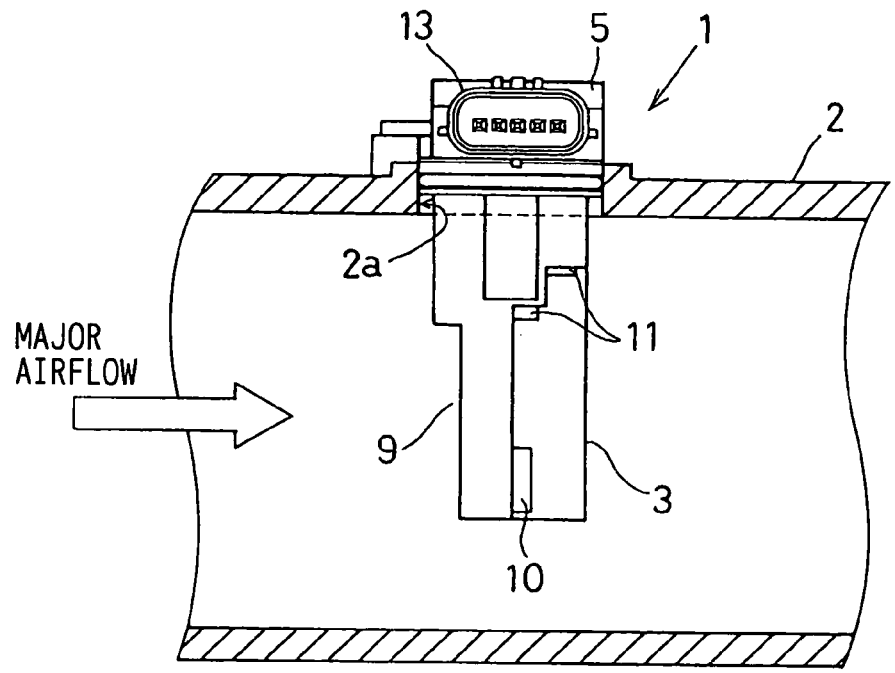
FIG. 3 is a cross-sectional view showing an airflow meter installed in an intake duct.

An airflow meter 1 described in a first embodiment is used as an airflow meter 1 for detecting the intake air amount of an internal combustion engine. As shown in FIG. 1, the airflow meter 1, and disposed in an intake duct 2, which forms an air passage of the present invention, as shown in FIG. 3. The airflow meter 1 is composed of a mensurative body 3, a sensing portion 4, a circuit module 5 and so on.

The mensurative body 3 is inserted into the intake duct 2 through a mounting hole 2a formed on the intake duct 2 to be exposed in an air flowing in the intake duct 2.

The mensurative body 3 is provided in a planiform shape of which a dimension in a thickness direction is smaller than that in a width direction shown in FIG. 1, and disposed so that the width direction is along an airflow direction in the intake duct 2 (refer to FIG. 3). In the following description, the air flowing in the intake duct 2 is referred to as a main flowing air and the airflow of the main flowing air is referred to as a main airflow.

In the mensurative body 3, as shown in FIG. 3, is formed a bypass passage 6 in which a part of the main flowing air flows as a mensurative air. The bypass passage 6 is formed in an U-shape (a reverse U-shape in FIG. 1), and has a U-turn portion in which an airflow direction of the mensurative air turns by 180 degrees. The bypass passage 6 is formed so that a passage at an upstream side of the U-turn portion (referred to as an inlet passage 6a) and a passage at a downstream side of the U-turn portion (referred to as an outlet passage 6b) are disposed along a radial direction of the intake duct 2.

Further, the mensurative body 3 has a restriction portion 8 at both sides in the thickness direction on an inner face forming the inlet passage 6a to decrease a width of the inlet passage 6a (a width in the thickness direction).

Figure 2A:
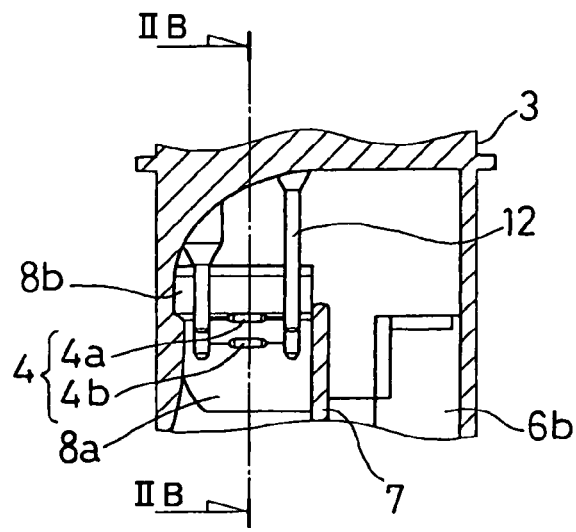
FIG. 2A is a cross-sectional view of an inlet passage taken in a width direction thereof in which a restriction portion is shown.
Figure 2B:
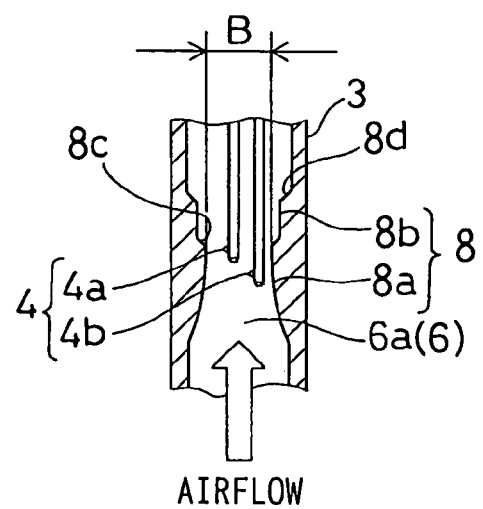
FIG. 2B is a cross-sectional view of the inlet passage taken in line IIB—IIB in FIG. 2A.

As shown in FIG. 2B, the restriction portion 8 is provided with a first restriction portion 8a and a second restriction portion 8b. The first restriction portion 8a gradually decreases a passage width of the inlet passage 6a in an airflow direction of the mensurative air flowing in the inlet passage 6a (in a direction shown by an arrow). The second restriction portion 8b increases the passage width in a stepped manner at an immediately downstream side of a narrowest portion B in which the passage width of the first restriction portion 8a is minimum and restricting the passage width to a predetermined dimension along a predetermined length in the airflow direction.

As shown in FIG. 2B, the first restriction portion 8a gradually increases its height from the inner face of the mensurative body 3 and terminates at the narrowest portion B. The second restriction portion 8b is disposed in such a manner continuously to the first restriction portion 8a to interpose the step portion 8c therebetween and to have a constant height from the inner face of the mensurative body 3 along the airflow direction.

Here, the step portion 8c interposed between the first restriction portion 8a and the second restriction portion 8b has an inclined inner face to gradually increase the passage width from the narrowest portion B of the first restriction passage 8a to the second restriction portion 8b. A downstream end portion 8d of the second restriction portion 8b is formed in an slant face inclined to the inner face of the inlet passage 6a.

As shown in FIG. 2A, the first restriction portion 8a and the second restriction portion 8b extends all over the width direction (lateral direction in the figure) of the inlet passage 6a.

The mensurative body 3 has a bypass inlet 9 for flowing the mensurative air into the bypass passage 6 and a bypass outlet to flowing the mensurative air out of the bypass passage 6.

As shown in FIG. 1, the bypass inlet 1 has a large opening extending from the front face of the mensurative body 3 which counters the main air flow to a bottom face of the mensurative body 3. Thus, the mensurative air enters in the bypass inlet 9, turn approximately by a right angle and flows in the inlet passage 6a as shown by an arrow in the figure.

The bypass outlet 10, 11 are a main outlet 10 opening at a most downstream end of the bypass passage 6 and a sub outlet 11 disposed between the U-turn portion of the bypass passage 6 and the main outlet 10.

The sensing portion 4 has a heater device 4a for measuring the airflow amount and a temperature sensing device 4b for measuring the temperature, which are respectively connected via a terminal 12 to a circuit board (not shown) enclosed in the circuit module 5.

The sensing portion 4 is disposed at an upstream side of the U-turn portion of the bypass passage 6, namely in the inlet passage 6a. Specifically, as shown in FIG. 2A, the sensing portion 4 is disposed at a position in which the passage width is small by the restriction portion 8 in the inlet passage 6.

As shown in FIG. 1, the heater device 4a and the temperature sensing device 4b each are electrically connected at both longitudinal end portions to the terminal 12, and a longitudinal direction thereof is disposed approximately in parallel to the main airflow direction in the intake duct 2. In other words, the heater device 4a and the temperature device 4b are disposed so that the longitudinal direction thereof is in parallel with the both side faces in the thickness direction of the mensurative body 3.

The circuit module 3 is disposed integrally with and at an top potion of the mensurative body 3. As shown in FIG. 3, the circuit module 5 is brought out of the intake duct 3. The circuit module 5 controls the electric current flowing in the heater device 4a to keep a difference between the temperature of the heater device 4a and the detection temperature by the temperature sensing device 4b (a temperature of the intake air) to a predetermined value. Further, the circuit module 5 is connected via a wire harness (not shown) to an ECU (Electric Control Unit, not shown) to output voltage signals in accordance with the current flowing in the heater device 4a to the ECU. The ECU determines the intake air amount based on the voltage signal outputted by the circuit module 5. Here, a connector 13 (refer to FIG. 1) is formed at a side portion of and integrally with the circuit module 5 to connect the wire harness.

(Actions and Effects of the First Embodiment)

The airflow meter 1 having the above-described configuration can restrict the mensurative air entered through the bypass inlet 9 into the inlet passage 6a from eddying by providing the inlet passage 6a disposing the sensing portion 4 therein with the restriction portion 8. Especially, a pressure loss at the restriction portion 8 is limited by disposing the second restriction portion 8b at the downstream side of the first restriction portion 8a and by increasing the passage width at the downstream side of the narrowest portion B of the first restriction portion 8a in a stepped manner. Thus, even when the airflow amount of the airflow entering into the inlet passage 6a is small, the airflow speed is not so much decreased by the pressure loss to improve the measuring accuracy in a small airflow field and to increase an measurement range to extend from the small airflow range to a large airflow range.

Further, the airflow is restricted from eddying at a portion close to the sensing portion 4 by the second restriction portion 8b disposed at the downstream side of the first restriction portion 8a to restrict the passage width to a predetermined constant along a predetermined length in the airflow direction of the mensurative air not to increase the passage width discontinuously. As a result, as shown by arrow in FIG. 4, the airflow does not cause separation of the airflow (an eddy) to stabilize the airflow speed and to obtain an stable output even when the airflow amount is relatively small.

Figure 4:
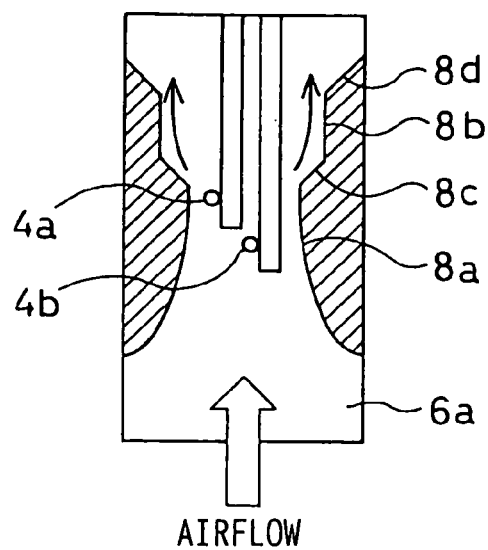
FIG. 4 is an enlarged cross-sectional view of the inlet passage in which a shape of a restriction portion is shown.

Still further, as shown in FIGS. 2B and 4, the restriction portion 8 described in the first embodiment has the step portion 8c disposed between the first and second restriction portions 8a, 8b and the downstream end portion 8d of the second restriction portion 8b each has slant faces. Thus, the airflow meter 1 in this embodiment in which the mensurative air flows in the inlet passage 6a from lower portion to an upward in a vertical direction can restrict dusts in the mensurative air from adhering on the slant faces to decrease the sediment of dusts on the slant faces.

(Modifications of the First Embodiment)

Figure 5A:
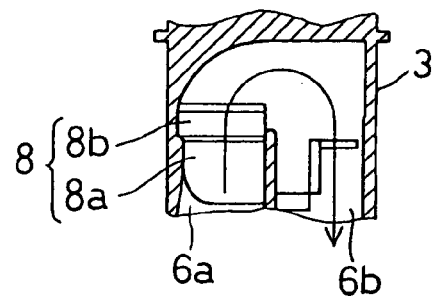
FIG. 5A is a cross-sectional view of the inlet passage in which a shape of a second restriction portion is shown.
Figure 5B:
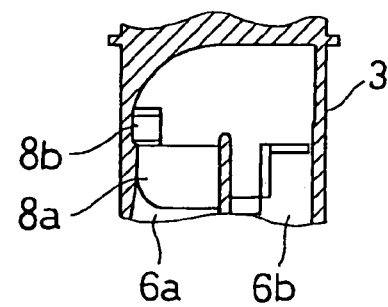
FIG. 5B is a cross-sectional view of the inlet passage in which more shape of the second restriction portion is shown.
Figure 5C:
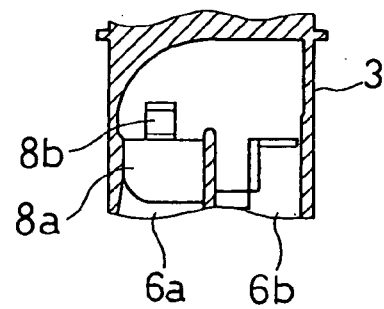
FIG. 5C is a cross-sectional view of the inlet passage in which another shape of the second restriction portion is shown.
Figure 5D:
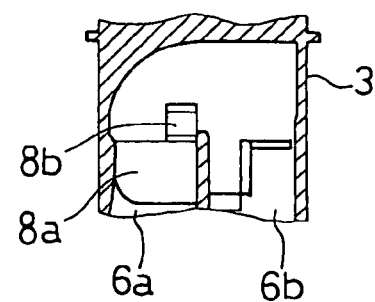
FIG. 5D is a cross-sectional view of the inlet passage in which a still another shape of the second restriction portion is shown.
Figure 6A:
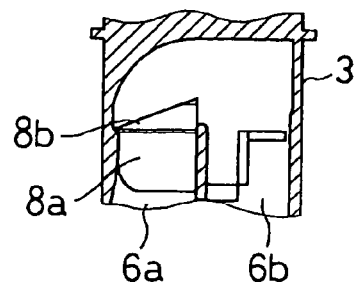
FIG. 6A is a cross-sectional view of the inlet passage in which a further shape of a second restriction portion is shown.
Figure 6B:
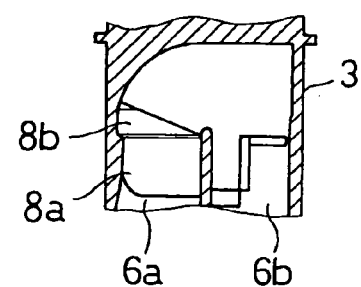
FIG. 6B is a cross-sectional view of the inlet passage in which a still further shape of the second restriction portion is shown.
Figure 6C:
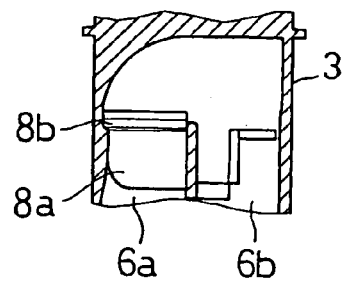
FIG. 6C is a cross-sectional view of the inlet passage in which another shape of the second restriction portion is shown.
Figure 6D:
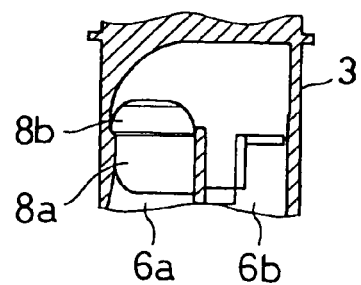
FIG. 6D is a cross-sectional view of the inlet passage in which a still another shape of the second restriction portion is shown.

In the first embodiment, as shown in FIG. 5A, the second restriction portion 8b is disposed to extend all over the width direction of the inlet passage 6a. The second restriction portion, however, may be disposed to extend at a portion in the width direction of the inlet passage 6a as shown in FIGS. 5B to 5D. In these cases, the second restriction portion 8b is located in accordance with a length of the bypass passage 6, positions of the bypass outlets 10, 11, a shape of the bypass passage 6, and so on.

Further, when the second restriction portion 6b is disposed to extend all over the width of the inlet passage 6a, the second restriction portion 6a may be formed in other shapes as shown in FIGS. 6A to 6D for example.

Figure 7A:
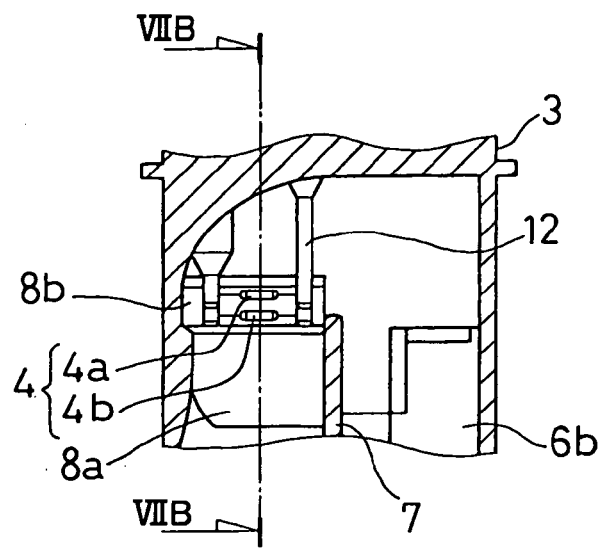
FIG. 7A is a cross-sectional view of an inlet passage taken in a width direction thereof in which another example of the restriction portion is shown.
Figure 7B:
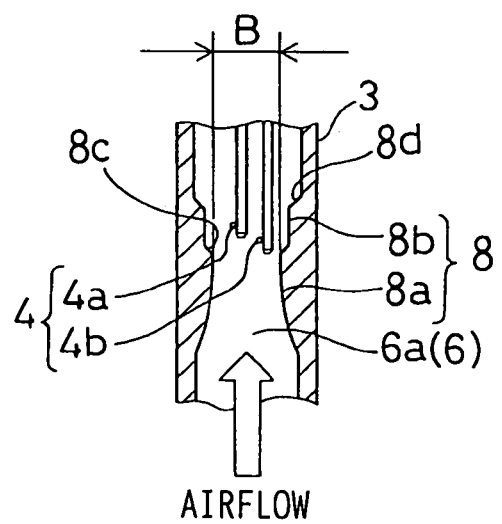
FIG. 7B is a cross-sectional view of the inlet passage taken in line VIIB—VIIB in FIG. 7A.
Figure 8:
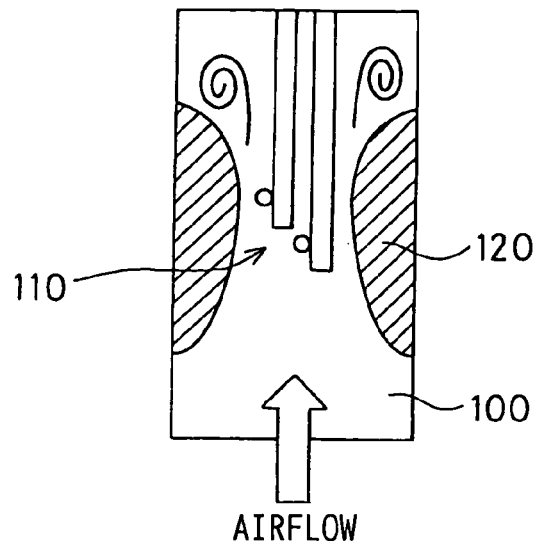
FIG. 8 is a cross-sectional view of a conventional bypass passage showing a shape of a restriction portion.
Figure 9:
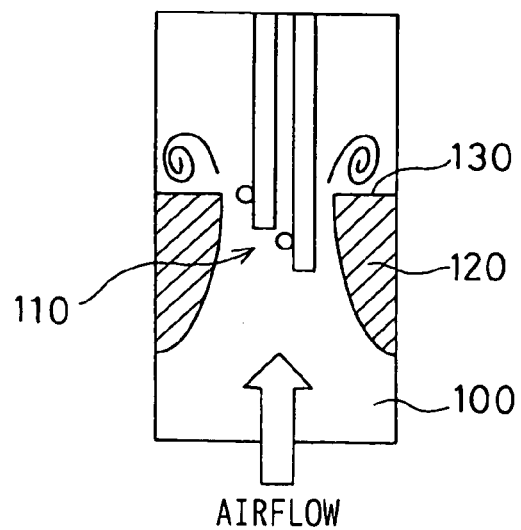
FIG. 9 is a cross-sectional view of a conventional bypass passage showing a shape of a restriction portion.

In the first embodiment, as shown in FIGS. 2A and 2B, the sensing portion 4 is located in a vicinity of the narrowest portion B of the first restriction portion 8a. The sensing portion 4, however, may be located in a bound in which the second restriction portion 8b is disposed as shown in FIGS. 7A and 7B.

In the first embodiment, the restriction portion 8a is disposed on both side faces in the width direction of the inlet passage 6a. The restriction portion 8a, however, may be disposed on several side faces or on one side face of the inlet passage 6a.

Further, the sensing portion 4 has the heater device 4a. The heater device 4a can be alternated with another measuring devices (a semiconductor device, for example).

Still further, the bypass passage 6a may have a shape which does not turn the airflow direction of the mensurative air, namely in parallel with the intake duct 2.

This description of the invention is merely exemplary in nature and, thus, variations that do not depart from the gist of the invention are intended to be within the scope of the invention. Such variations are not to be regarded as a departure from the spirit and scope of the invention.

What is claimed is:

1. An airflow meter for detecting an airflow amount flowing in an air passage comprising a bypass passage disposed in the air passage and provided with:
    a first restriction portion gradually decreasing a passage width of the bypass passage in an airflow direction in the bypass passage; and
    a second restriction portion in the bypass passage disposed at an immediately downstream side in the airflow direction through the bypass passage of a narrowest portion of the first restriction portion and increasing the passage width in a stepped manner to limit the passage width to a constant width over a predetermined length in the airflow direction, the constant width being larger than the passage width at the narrowest portion of the first restriction portion and smaller than the passage width of the bypass passage downstream in the airflow direction of the second restriction portion,
    and further comprising a sensing portion located in an area in which at least one of the first restriction portion and the second restriction portion is disposed.

2. The airflow meter according to claim 1, wherein the sensing portion is located at an immediately upstream side or at an immediately downstream side of the narrowest portion.

3. The airflow meter according to claim 1, wherein a stepped portion disposed between the first restriction portion and the second restriction portion is a slant face gradually increasing the passage width from the narrowest portion of the first restriction portion to the second restriction portion.

4. The airflow meter according to claim 1, wherein a downstream end portion of the second restriction portion is a slant face inclined toward an inner face of the bypass passage.

5. The airflow meter according to claim 1, wherein the second restriction portion is disposed to extend over the entire width of the bypass passage.

6. The airflow meter according to claim 1, wherein the second restriction portion is disposed to extend over a part of the width of the bypass passage.

7. The airflow meter according to claim 1, wherein the sensing portion has a heater device for measuring the air flow amount and a temperature sensing device for measuring the temperature.

8. The airflow meter according to claim 1, wherein the bypass passage is U-shaped having a U-turn portion.

9. The airflow meter according to claim 8, wherein the sensing portion is disposed at an upstream side with respect to the airflow direction of the U-turn portion of the bypass passage.

* * * * *